(12) United States Patent
Merino et al.

(10) Patent No.: US 6,688,632 B2
(45) Date of Patent: Feb. 10, 2004

(54) BOARD OF A GLIDING APPARATUS AND GLIDING APPARATUS INCLUDING SUCH A BOARD

(75) Inventors: Jean-François Merino, Epagny (FR); Laurent Damiani, Annecy (FR)

(73) Assignee: Salomon S.A., Metz-Tessy (FR)

( * ) Notice: Subject to any disclaimer, the term of this patent is extended or adjusted under 35 U.S.C. 154(b) by 0 days.

(21) Appl. No.: 09/915,454

(22) Filed: Jul. 27, 2001

(65) Prior Publication Data

US 2002/0011717 A1 Jan. 31, 2002

(30) Foreign Application Priority Data

Jul. 28, 2000 (FR) .............................. 00 10774

(51) Int. Cl.⁷ ................................. A63C 5/04
(52) U.S. Cl. .................. 280/609; 280/602; 280/610; 340/568.6
(58) Field of Search ................. 280/609, 601, 280/602, 610, 612, 611, 613, 809; 704/270, 272, 271, 275, 235, 260; 340/572.6, 571, 573, 568.6

(56) References Cited

U.S. PATENT DOCUMENTS

| | | | | |
|---|---|---|---|---|
| 4,627,635 A | * | 12/1986 | Koleda | 280/602 |
| 4,671,529 A | * | 6/1987 | LeGrand et al. | 280/610 |
| 5,806,875 A | * | 9/1998 | Bonvallet | 280/602 |
| 6,095,547 A | * | 8/2000 | Vandergrift et al. | 280/602 |
| 6,275,153 B1 | * | 8/2001 | Brooks | 340/568.6 |
| 6,371,380 B1 | * | 4/2002 | Tanimur | 235/497 |

FOREIGN PATENT DOCUMENTS

| | | | | |
|---|---|---|---|---|
| AT | 390005 | | 3/1990 | |
| CA | 2238529 | | 11/1999 | |
| DE | 3513020 | | 10/1986 | |
| DE | 10017142 | * | 10/2001 | ............... 235/497 |
| EP | 0441318 | | 8/1991 | |
| FR | 2778987 A1 | * | 11/1999 | ........... G01V/3/12 |
| WO | WO99/54005 | | 10/1999 | |

* cited by examiner

Primary Examiner—Brian L. Johnson
Assistant Examiner—Hau Phan
(74) Attorney, Agent, or Firm—Greenblum & Bernstein, P.L.C.

(57) ABSTRACT

A gliding board including a longitudinal beam having a laminated structure that includes a bottom surface layer possibly edged with lateral running edges, reinforcing layers, a decorating layer, and a central core, the board being equipped with a data exchange label. The data exchange label is positioned at a distance greater than or equal to 2 millimeters from any metallic mass of the stack.

15 Claims, 8 Drawing Sheets

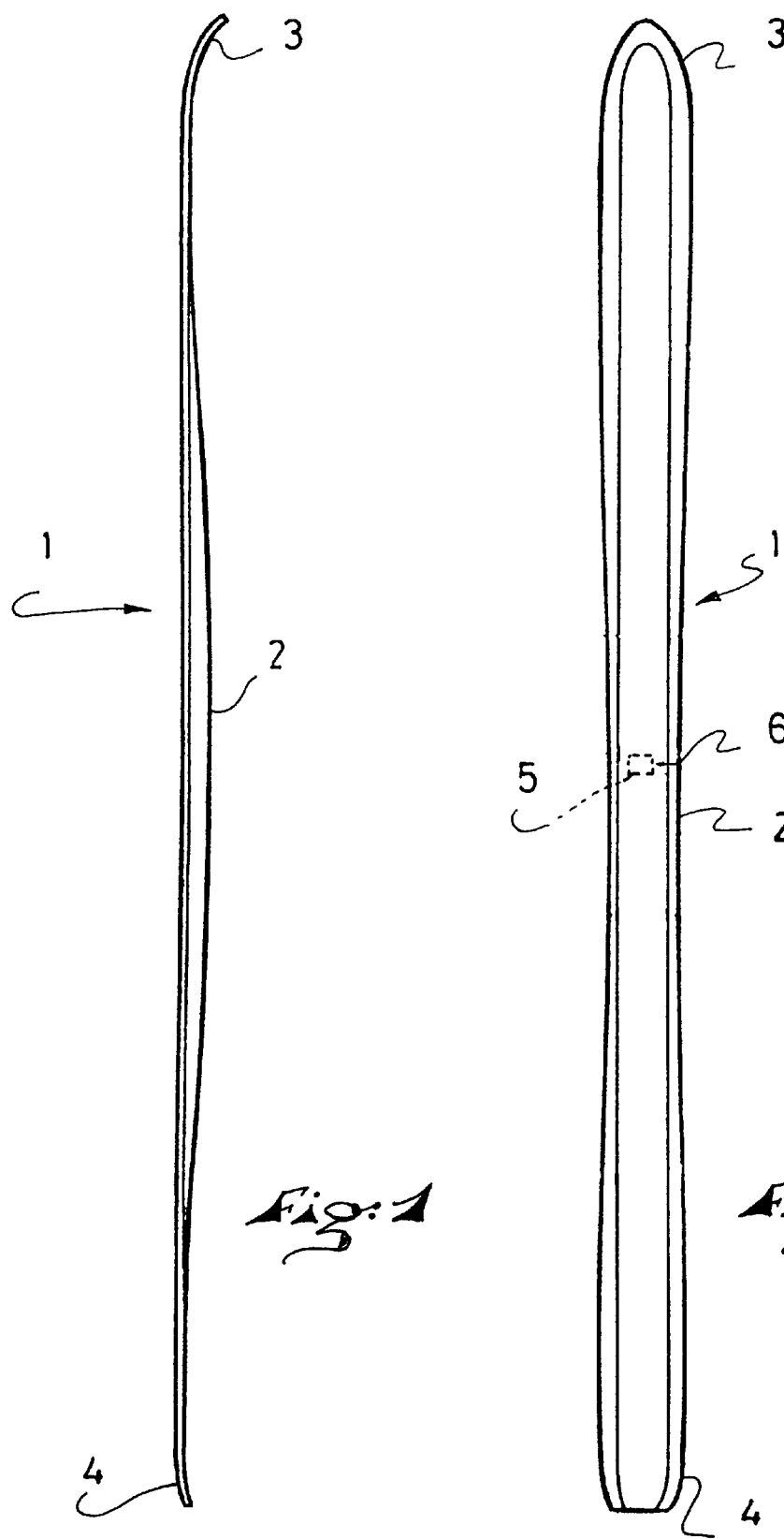

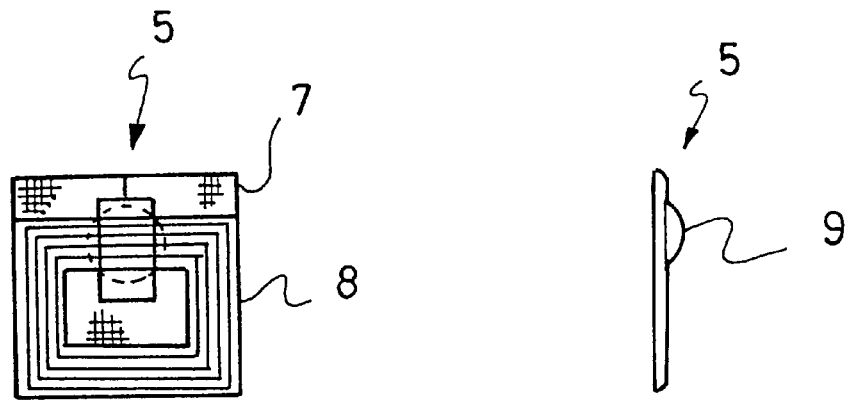
*fig. 3*   *fig. 4*
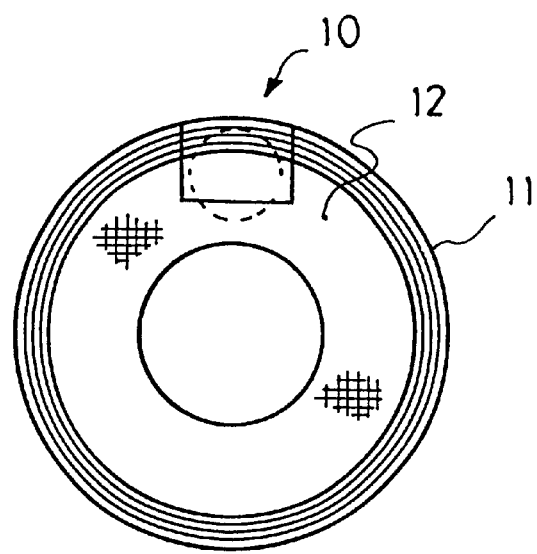
*fig. 5*

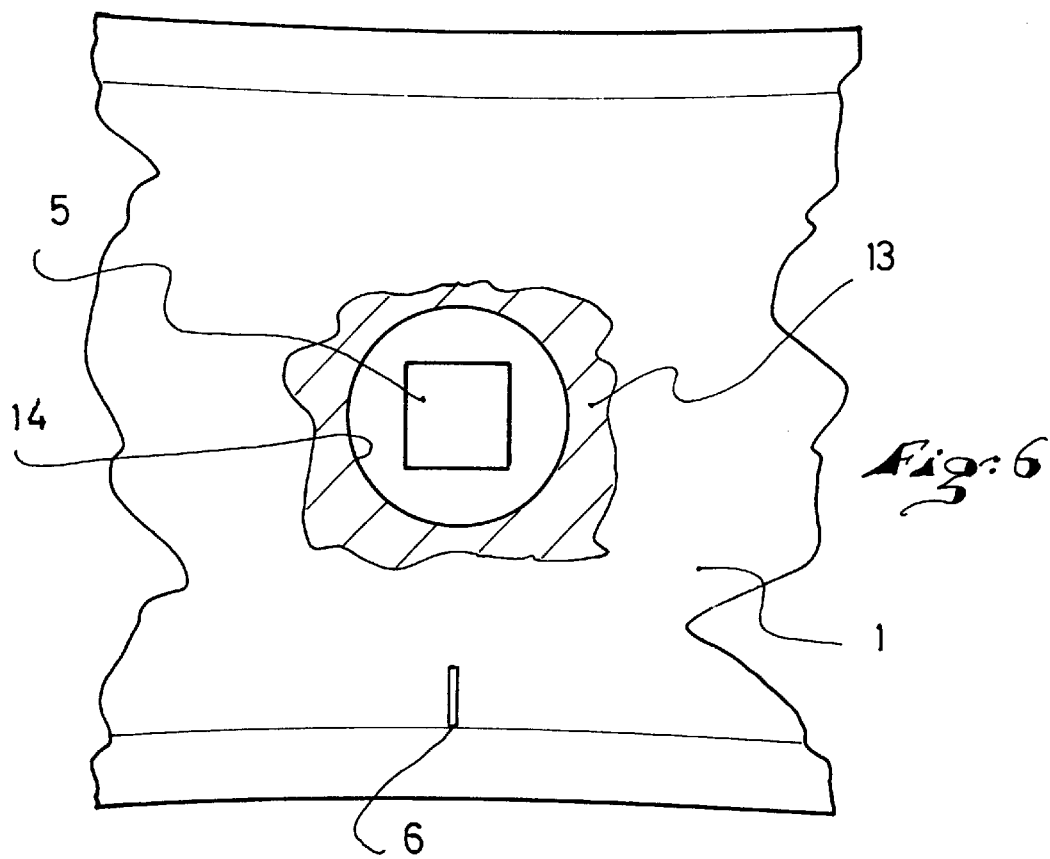
*Fig. 6*
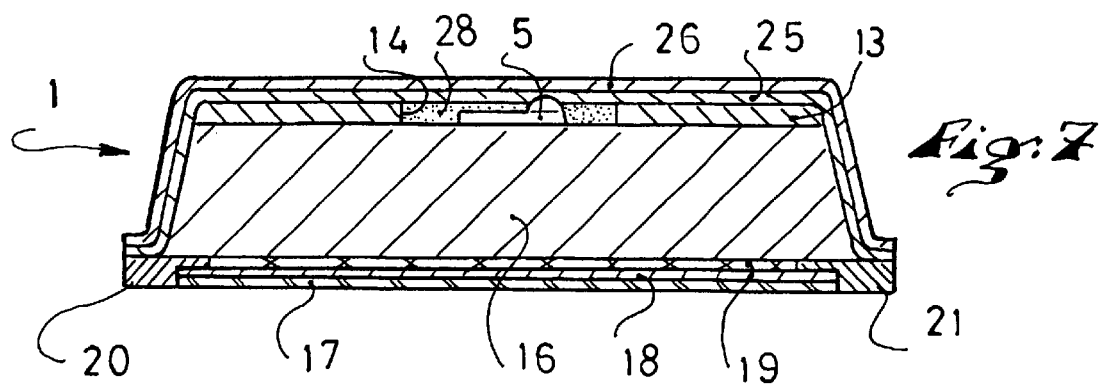
*Fig. 7*
*Fig. 8*  *Fig. 9*

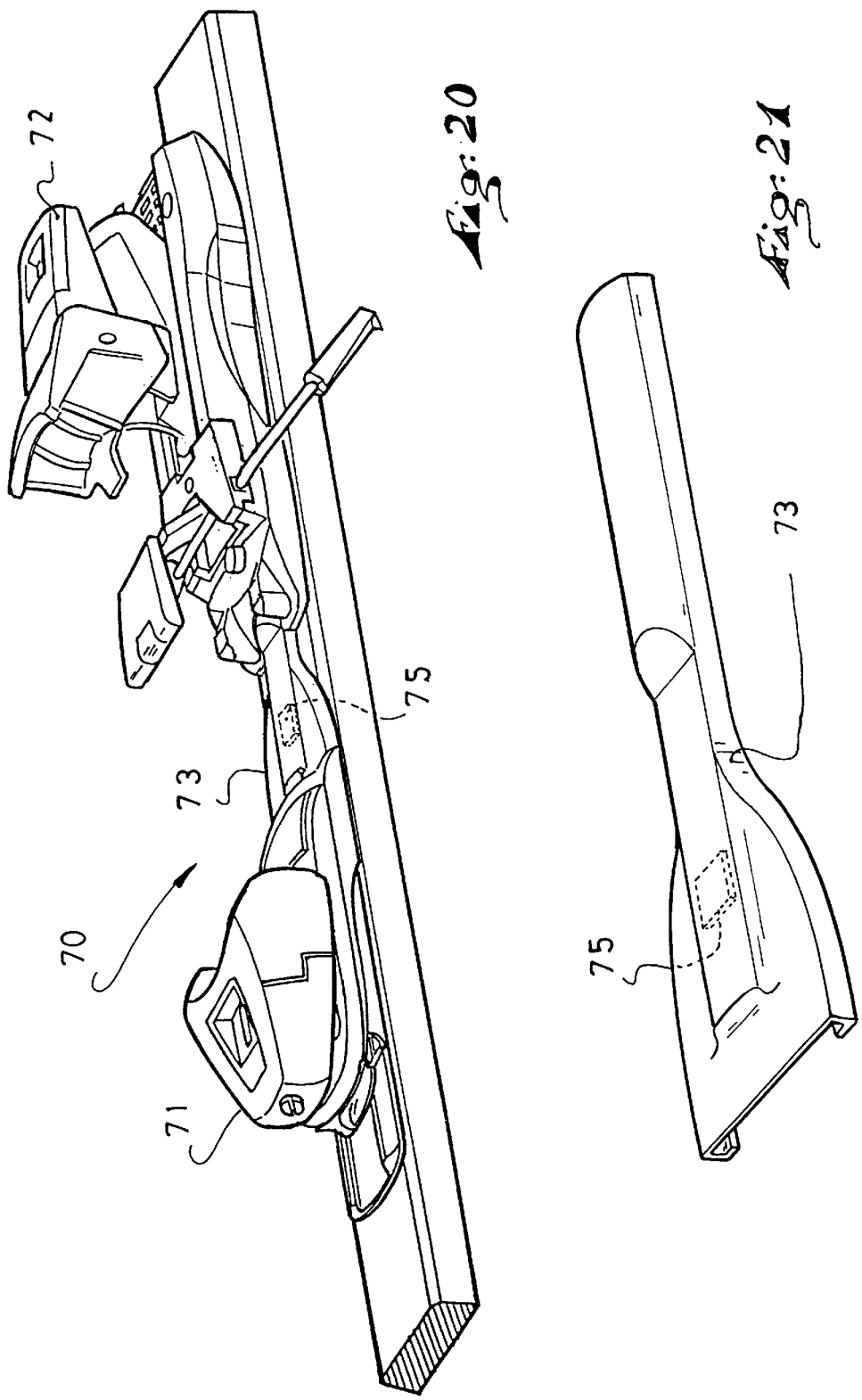

BOARD OF A GLIDING APPARATUS AND GLIDING APPARATUS INCLUDING SUCH A BOARD

CROSS-REFERENCE TO RELATED APPLICATIONS

This application is based upon French Patent Application No. 00 10774, filed Jul. 28, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to the board of a gliding apparatus, in particular an alpine ski, as well as a gliding apparatus including such a board.

More specifically, the invention relates to such articles which incorporate an electronic data exchange label with an external reading and writing device.

2. Description of Background and Relevant Information

In the case of an alpine ski, an electronic data exchange label is disclosed in the patent documents EP 441 318 and WO 99/54005, in which it is integrated into the structure of a ski during manufacture. According to these documents, the label, which is a relatively thin element, is merely inserted between two layers in the laminated structure that forms the ski. In the first case, the label is passive, it can only be read. In the second case, the label has a rewritable memory, i.e., it can receive and store data transmitted thereto, and which data can be read subsequently. The data exchange with the label is done remotely, without any physical contact, by means of an appropriate reading or writing device.

Among the commercially available labels, two reading/writing techniques are generally known, which depend mainly on the format of the label, and also on the frequency used to perform the data exchange. According to a first reading/writing method, these operations are performed over a short distance by means of a portable device which is presented in the vicinity of the label. According to another method, the operations are performed over a longer distance by means of a stationary installation, for example, when the article and its user pass between the side panels of a detection gate.

In both cases, it has been found that the data exchanges could be interfered with by the metallic masses of the board or of the boot retaining elements. For example, the skis of the fibro-metal type have two metallic reinforcing layers on the top and bottom which are capable of hiding the label from the detection apparatus. The retaining elements also have various metallic parts that can hinder the reading and writing operations.

SUMMARY OF THE INVENTION

An object of the invention is to improve the existing gliding boards and retaining assemblies so that the reading and writing operations of the data exchange label with which they are equipped become easier and more reliable.

This object is achieved for the gliding board according to the invention, which includes a longitudinal beam whose structure is formed by a stack, or laminated structure, which includes a bottom surface layer possibly edged with lateral running edges, reinforcing layers, a decorating layer, and a central core, the board being equipped with a data exchange label. The data exchange label is positioned at a distance greater than or equal to about 2 millimeters from any metallic mass of the stack.

In particular, when the structure of the board includes upper and lower metallic reinforcing layers, the invention provides a cutout in at least one of the metallic reinforcements, and the positioning of the data exchange label in the center of the cutout.

The connecting piece of the gliding apparatus bears a data exchange label, the gliding apparatus having front and rear retaining elements connected to one another by a connecting piece made of a non-conducting material.

In this way, the data exchange label is positioned at an adequate distance from any metallic mass of either one of the retaining elements, or of the board.

BRIEF DESCRIPTION OF DRAWINGS

The invention will be better understood from the description that follows, with reference to the annexed drawings which are an integral part thereof.

FIG. 1 shows a side view of an alpine ski.

FIG. 2 shows a top view of the alpine ski of FIG. 1.

FIG. 3 shows a top view of a data exchange label.

FIG. 4 is a side view of the label of FIG. 3.

FIG. 5 shows another data exchange label.

FIG. 6 shows a ski portion, partially broken-away in the area of the label.

FIG. 7 is a cross-sectional view of the ski in the area of the label.

FIG. 8 shows a top view of the label borne by a pellet.

FIG. 9 shows a side view of the label and its pellet.

FIG. 20 shows the invention as applied to a boot retaining assembly.

FIG. 21 shows the connecting piece of FIG. 18.

DETAILED DESCRIPTION OF THE INVENTION

Figure 10:
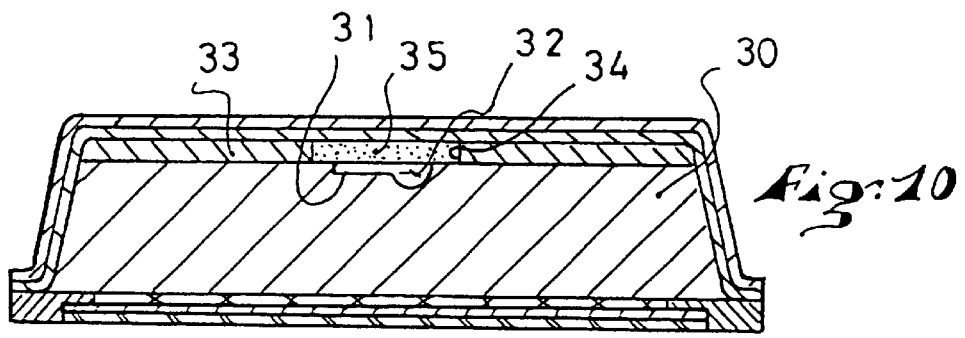
FIG. 10 is a cross-sectional view of a ski according to an alternative embodiment of the invention.

FIG. 1 shows a side view of a ski 1 having a conventional structure. In a known fashion, the ski 1 has the form of an elongated beam with a central zone 2 where the elements for retaining the boot will be assembled, a turned up shovel 3 at the front, and a tail 4 at the rear.

FIG. 2 shows a top view of the same ski. A data exchange label is schematically designated by the reference numeral 5. According to a first preferred embodiment of the invention, the label 5 is positioned in the central zone 2 of the ski, in the vicinity of the reference mark 6 which is the ski center reference mark. This reference mark is present on most of the current skis, and makes it possible to position the retaining elements during the assembly thereof.

The data exchange label 5 is of a known type and is commercially available. A first example is shown in an enlarged view in FIG. 3. The label includes a thin track of conducting material, such as copper, wound along turns 8 at the surface of an insulating plate 7 made of epoxy, for example. These turns form a coil, or antenna, that is connected to an electronic circuit located on the back of the label where it forms a bulge 9. The electronic circuit contains a read-only memory (ROM) zone with an identification code of the label, and a random access memory (RAM) zone where temporary data can be stored. When the coil is subject to the electromagnetic field of the reading/writing apparatus, it generates an electric current for feeding the electronic circuit. Furthermore, it functions as a duplexer through which the reading, writing, or deleting instructions, and the read or written data are transmitted.

A second example of label 10 is shown in FIG. 5, also in an enlarged view. Instead of being wound along a rectangle, the turns 11 are wound along circumferences on the insulating support 12.

Other types of labels are also suitable, with other rigid or flexible supports.

FIG. 6 schematically shows a first method of incorporating the label 5 into the ski structure. The ski 1 is shown therein in a top view which is partially broken-away until the upper metallic reinforcing layer 13 and the label 5 are visible. As is described in more detail below, the ski 1 is of the fibro-metal type, i.e., its structure includes two upper and lower metallic reinforcing layers made, in particular, of aluminum alloy.

According to the embodiment shown in FIG. 6, the label 5 is positioned within a cutout 14 of the upper reinforcing layer. The cutout is of any appropriate shape, round as in the figure, or square, provided that its contour is sufficiently cleared of the turns of the label. The distance between the turns of the label and the metallic reinforcement has been estimated to be greater than or equal to 2 millimeters, or about 2 millimeters, and preferably at least equal to 5 millimeters, or about 5 millimeters.

The position of the label in the vicinity of the reference mark 6 of the middle of the ski has been selected so that the cutout 14 is in fact made in the central zone of the ski where the reinforcement 13 is not very biased, i.e., not subjected to relatively significant forces. As a result, the behavior of the ski in bending is not significantly affected by this cutout.

With respect to the lower metallic reinforcement, the predetermined minimum distance indicated hereinabove is also respected. Indeed, in the central zone of the ski, the two metallic layers are at a distance of about 8 millimeters. The label is therefore located more than 2 millimeters, or even more than 5 millimeters from this reinforcement.

FIG. 7 shows a cross-section of the ski 1 in the area of the label. The ski structure shown in this figure is formed by a stack of layers located above and beneath a central core 16. The core can be made of wood or foam, for example. Beneath the core, a bottom surface layer 17 is overlaid by a lower reinforcing layer 18 made of resin-impregnated fibers, which is itself overlaid by a lower metallic reinforcing layer 19, the assembly being edged with two metallic running edges 20 and 21.

On the top, the core is covered by an upper metallic reinforcing layer 13, an upper reinforcing layer 25 made of fibers which descends down to the running edges, and a decorating layer 26.

This figure shows the cutout 14 made in the upper metallic reinforcing layer 13 and the label 5 positioned in the center of the cutout.

With respect to the thicknesses, a metallic reinforcement measures about 0.5 millimeters in thickness, and a label measures 0.5 to 1.0 millimeters, or about 0.5 to 1.0 millimeters, depending on the models, in its thickest zone, i.e., the zone 9 of the electronic circuit. The remainder of the label measures about 0.2 millimeter.

Thus, according to the embodiment of the invention shown in FIG. 6, the label is integrated into the thickness of the metallic reinforcement without any problem, the thickness of the bulge 9 being easily absorbed in the thickness of the other adjacent layers.

So as to facilitate the centering of the label in the center of the cutout, the label can be positioned in the center of a non-metallic member 28, hereinafter referred to as a pellet, whose dimensions are substantially equal to the dimensions of the cutout horizontally and in thickness.

The pellet 28 can be a molded element on which the label is attached, as shown in FIGS. 8 and 9. Another solution consists of duplicate molding a pellet around the label. Still other possibilities exist and are not beyond the scope of the invention.

In addition to the centering of the label, the pellet ensures the filling up of the recess within the cutout, which avoids a depression in which the resin and the fibers of the reinforcing layers 25 could flow during the manufacture of the ski.

Instead of a pellet, the insulating support of the antenna and of the electronic circuit could be provided to overlap laterally from the contour of the antenna by a distance of at least 2 millimeters.

FIG. 10 relates to an alternative embodiment. According to this variation, the core 30 of the ski is machined with a recess 31 in which the label 32 is housed. The core is a wooden core or a machined core. Above the label, the metallic reinforcement 33 has a cutout 34 which is preferably filled up by a non-metallic pellet 35. In the case of a core made of a relatively soft material, in view of the thinness of the label and the softness of the material, it is not necessary to machine the recess 31 in advance; it suffices to place the label in the correct position in the mold; it creates its own recess under the effect of the pressure applied by the walls of the mold.

Figure 10A:
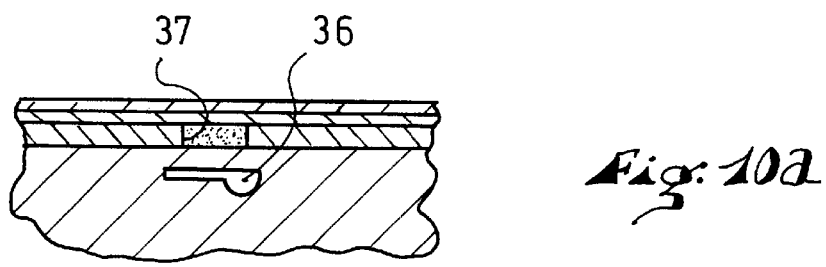
FIG. 10a is a variation of FIG. 10.

In a variation, FIG. 10a shows the label 36 embedded in the core, below the level of the metallic reinforcement, at a distance on the order of 2 millimeters. In this case, as shown in the figure, the dimensions of the cutout 37 of the reinforcement can be reduced. Possibly, they can be less than the horizontal dimensions of the label.

Figure 11:
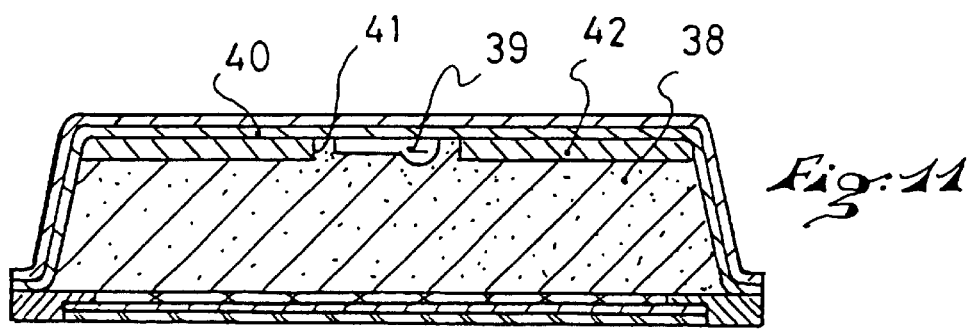
FIGS. 11 and 12 relate to other alternative embodiments.

FIG. 11 relates to a ski whose core 38 is injected in situ, i.e., within the ski manufacturing mold. In this case, the label 39 is attached to the lower surface of the reinforcement 40 made of fibers; for example, it is glued to this surface, and it is housed within the cutout 41 of the metallic reinforcement 42.

In this case, in principle, it is the injected foam of the core that fills up the empty space in the vicinity of the label; there is no need for a pellet.

Figure 12:
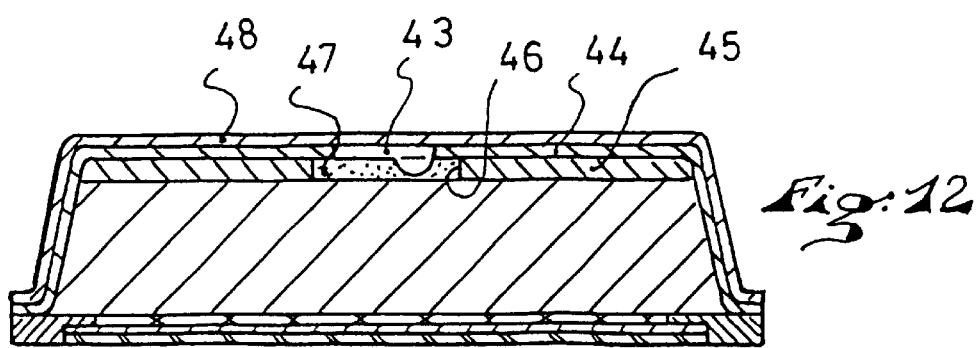

According to FIG. 12, the label 43 is positioned on the outer surface of the reinforcing layer 44 made of fibers, right beneath the outer decorating layer 48. As a result, the label is visible from the outside. As in the preceding cases, the metallic reinforcing layer 45 is bored with a cutout 46 in the center of which the label 43 is positioned, and the cutout 46 is preferably filled up by a non-conducting pellet 47.

With respect to the decorating layer, a thin metallic layer, for example an aluminum film, is used sometimes to create a background effect in the decoration of the ski.

In this case, a cutout must be provided in this decorating film, in the center of which the label will be positioned. The same applies if the decoration uses metallic powder as a pigment.

Figure 13:
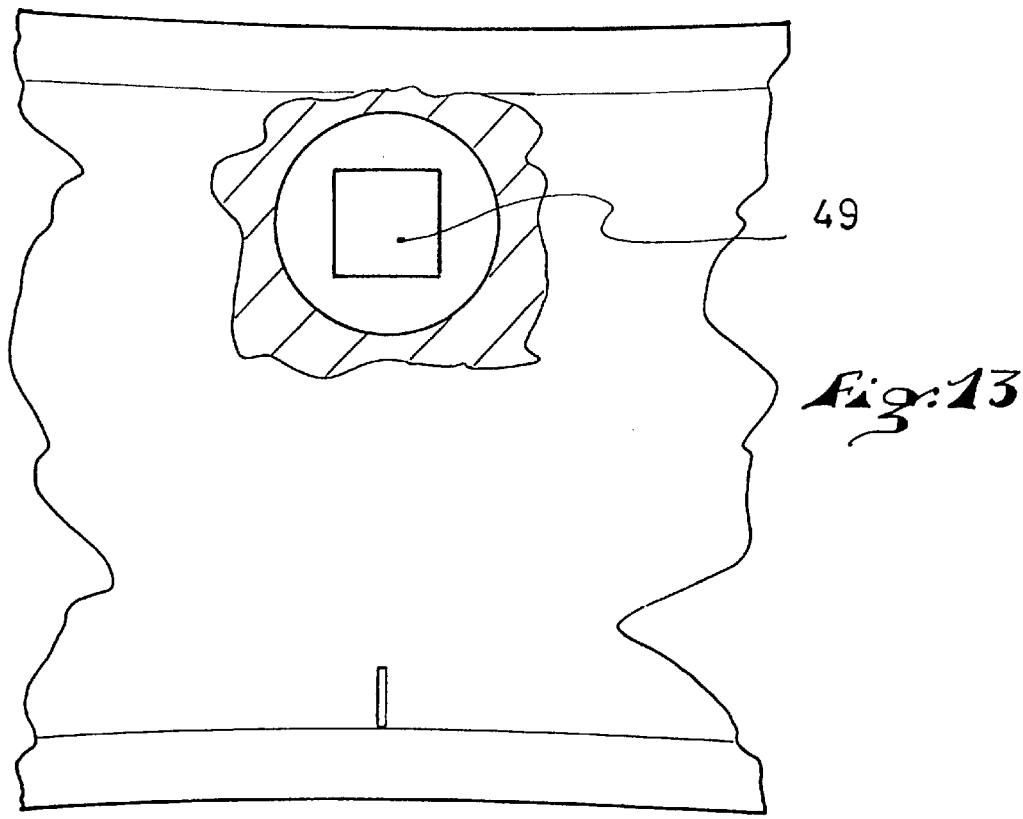
FIG. 13 shows an alternate positioning of the label.

FIG. 13 shows an alternative embodiment of the invention according to which the label 49 is offset toward a lateral edge of the ski. The cutouts of the metallic layers or films are offset in the same manner. The elements for retaining the boot are sometimes connected by a metallic connecting bar. By laterally offsetting the label, the label is cleared and an interference with such a bar is avoided.

The various embodiments which have been described show the label in the upper portion of the ski. This is not limiting, and the label could be placed close to the running surface of the ski, in the area of the lower metallic reinforcement.

Also, the central zone of the ski is a preferred zone in that the maximum thickness of the ski is in this area, that a cutout can be made in a reinforcement without deteriorating the ski structure, that it is the zone that is in front of a technician when he is assembling or adjusting the elements for retaining the boot, and that this zone is completely protected by the boot during the glide. However, this is not limiting, and the label could be placed in other locations where the metallic reinforcement is not very biased, in particular toward the shovel or the tail.

Figure 14:
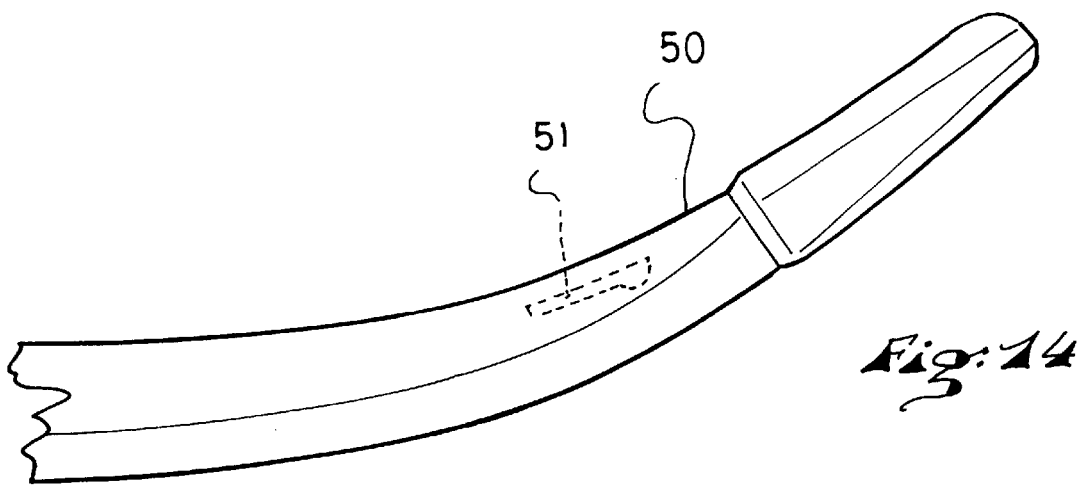
FIG. 14 relates to another embodiment of the invention.

To illustrate this, FIG. 14 shows the shovel 50 of a ski into which a label 51 is integrated.

Figure 15:
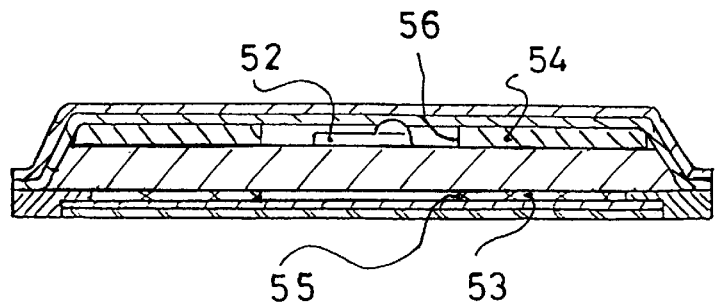
FIG. 15 is a cross-sectional view of the ski of FIG. 14 in the area of its label.

FIG. 15 is a cross-sectional view of the ski at the level of the shovel. Once again, the ski is of the fibro-metal type. The difference with the central zone of the ski is that the two metallic layers 53 and 54 are brought closer together in view of the thickness of the ski. In this case, the invention provides two cutouts 55 and 56 in each of the reinforcements. The cutout zones are superposed, and the label 52 is centered with respect to both zones.

Figure 16:
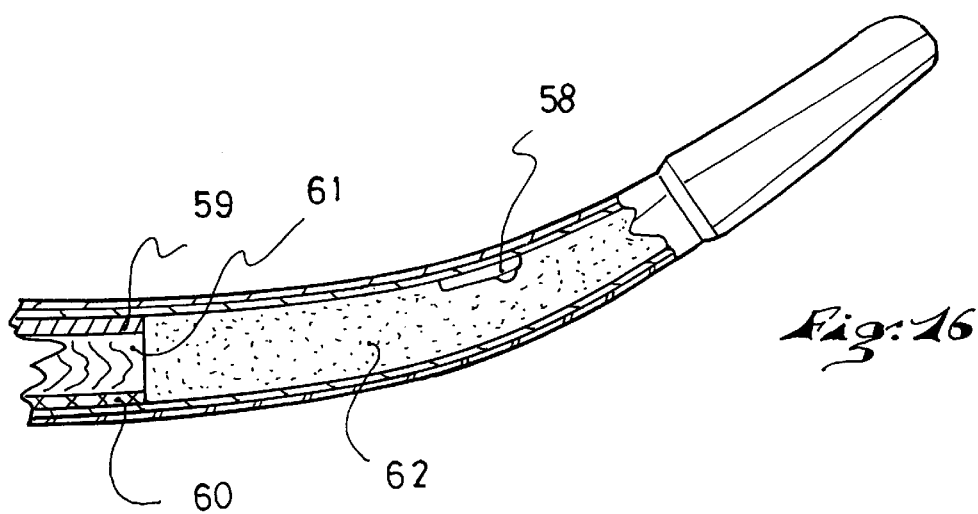
FIGS. 16–19 show other embodiments of the invention.

FIG. 16 shows an alternative construction of the ski which advantageously makes it possible to place the label 58 toward the shovel without any particular arrangement.

The two metallic reinforcements 59 and 60 and the core 61 are interrupted behind the shovel, toward the front contact line of the ski, and an auxiliary core 62 made, for example, of polyurethane foam, extends this assembly to form the shovel. The label 58 is placed in the area of this auxiliary core, and is therefore at a sufficient distance from the metallic layers. One could proceed in the same manner by placing the label in the area of the tail of the ski.

Figure 17:
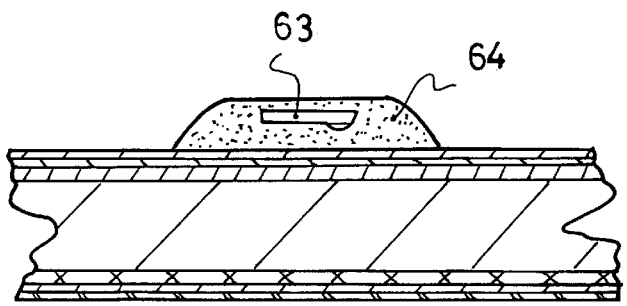

FIG. 17 relates to another alternative embodiment. The label 63 is here attached above the ski structure. It is borne by a raising wedge 64 which is assembled to the ski by any appropriate means, in particular gluing, welding, or the like. The thickness of the wedge is determined to maintain the label at an adequate distance from the metallic mass of the reinforcements.

Figure 18:
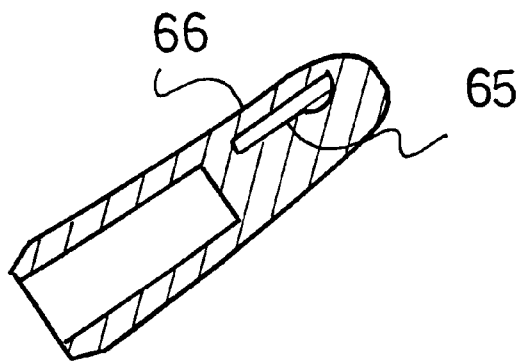
Figure 19:
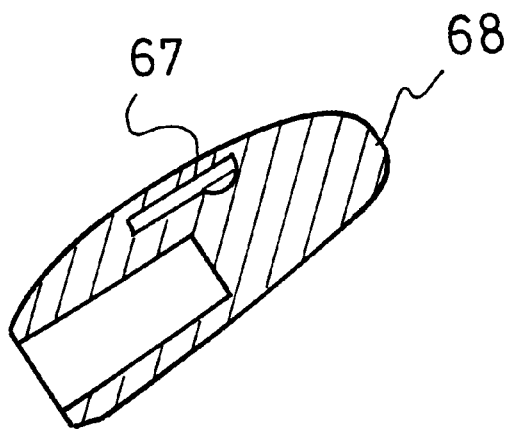

FIGS. 18 and 19 relate to alternative embodiments of the invention where the data exchange label is integrated into the end piece attached to the shovel of the ski.

According to FIG. 18, the label 65 is molded in the front end zone of the end piece 66 which is located in the extension of the ski structure. In this way, the label 65 is offset at a sufficient distance from a possible metallic element of the ski.

According to FIG. 19, the label 67 is housed in a bulging of the end piece 68 in the manner of the preceding raising wedge 64.

In this latter case, one can also provide an arrangement of the metallic reinforcements of the ski, for example a cutout, to keep the label further away from any metallic mass.

For the alternative embodiments of FIGS. 17–19, instead of being molded in the raising wedge or the end piece of the shovel, one could provide, in these elements, a housing having the dimensions of the label, with a cap or a pellet which would then be force fitted to seal the opening of the housing and mask the label.

The various embodiments that have been described relate to skis having fibro-metal layers. Indeed, it is the presence of the metallic reinforcements which risks causing reading/writing problems in the label. In the case of a ski having a fiber structure, the label can be placed a priori in any location, except in the vicinity of the running edges, the mounting zones of the retaining elements, a metallic decorating piece or film. However, for such skis, the same label location as that which has been defined for a fibro-metal ski is preferably used in order to perform the reading/writing operations according to the same operating mode, regardless of the type of ski. In particular, the embodiments of the ski that have been described relative to FIGS. 10, 11, 12, 14, 16–19 apply to all types of skis, regardless of their construction mode. In this case, it suffices to disregard the metallic layers.

FIG. 20 shows the invention as applied to an assembly 70 for retaining the boot on the ski. Conventionally, this assembly includes front and rear retaining elements 71 and 72. Due to their construction, these elements include a large number of metallic elements which risk disturbing the reading/writing operations of a label.

In these conditions, the most favorable location for the label is the connecting piece 73 that connects the two retaining elements. Such a connecting piece is commonly used, in particular for the retaining element adapted to the location. In general, this is a piece made of a molded plastic material, therefore free from metal. Moreover, the location is remote from the front and rear retaining elements, and it is sufficiently raised with respect to a possible metallic reinforcement of the ski.

FIGS. 20 and 21 show the label 75 integrated into the connecting piece, this operation being capable of being performed during the molding. This is not limiting, and the connecting piece could also be attached to the surface of the piece 73 by gluing, welding, or any other appropriate technique, or can be placed in an appropriate housing.

In the case where the ski is also equipped in its central zone with a data exchange label, the two labels of the ski and of the retaining assembly are advantageously located in the same zone. In these conditions, it is possible to read or write them both during the same operation, provided that the processing unit that is behind the reading/writing sensor is capable of processing a plurality of labels at the same time.

The present description is provided for guidance only, and other embodiments of the invention could be adopted without leaving the scope thereof.

In particular, the invention also applies to the boards used for cross-country skiing, snowboarding, and skateboarding. It could also apply to other gliding boards or apparatuses, the general idea of the invention being that if the board or apparatus is adapted to have a metallic layer or mass for any of its models, one selects for this model a location that is at a distance of at least 2 millimeters from any metallic mass. If necessary, a cutout is made in the metallic layer, and in this case, one selects a location where the layer is not very biased, and the labels are placed in the same location for the other models of the line.

What is claimed is:

1. A gliding board comprising:
    a longitudinal beam having a structure including a stack, said stack including a bottom surface layer, a plurality of reinforcing layers, a decorating layer, and a central core, a portion of said stack, other than said decorating layer, comprising at least one metallic mass;
    said plurality of reinforcing layers of said stack including at least one metallic reinforcing layer;
    said at least one metallic mass comprising said at least one metallic reinforcing layer;
    a data exchange label located in said cutout of said metallic reinforcing layer and being positioned at a distance greater than or equal to 2 millimeters from any of said at least one metallic mass of said stack.

2. A gliding board according to claim 1, wherein said label is positioned in a thickness of said metallic reinforcing layer.

3. A gliding board according to claim 2, wherein said label is positioned in a center of a non-conducting pellet whose dimensions in thickness and horizontal dimension correspond to dimensions of the cutout and to a thickness of said metallic reinforcing layer.

4. A gliding board according to claim 1, wherein said label is located toward a shovel or a tail of the gliding board, wherein said plurality of reinforcing layers include two reinforcements having superimposed cutouts, and wherein said label is centered with respect to either one of said cutouts.

5. A gliding board according to claim 1, wherein said label is offset toward one of the lateral edges of the gliding board.

6. A gliding board according to claim 1, wherein said structure further includes a pair of lateral running edges.

7. A gliding board according to claim 1 equipped with an assembly for retaining a boot.

8. A gliding board according to claim 7, wherein said assembly for retaining a boot includes front and rear retaining elements.

9. A gliding board according to claim 1, wherein said label is located in a center of said cutout of said metallic reinforcing layer.

10. A gliding apparatus according to claim 1, wherein said data exchange label includes a rewritable memory.

11. A gliding board made of non-metallic elements and at least one metallic element, said gliding board further comprising:
    a longitudinal beam including:
        a bottom surface layer, at least one lower reinforcement layer, a core, at least one upper reinforcement layer, a decorating layer, and a pair of laterally spaced apart running edges, said at least one metallic element comprising at least one of said reinforcement layers, said one of said reinforcement layers thereby comprising a metallic reinforcing layer, said metallic reinforcing layer having a cutout;
    a data exchange label positioned in said cutout of said metallic reinforcing layer and being positioned at a distance greater than or equal to 2 millimeters from said metallic element.

12. A gliding board according to claim 11, wherein said label is positioned in a thickness of said metallic reinforcing layer.

13. A gliding board according to claim 12, wherein said label is positioned in a center of a non-conducting pellet, said pellet having dimensions in thickness and horizontal dimension corresponding to dimensions of said cutout and to a thickness of said metallic reinforcing layer.

14. A gliding board according to claim 11, in combination with an assembly for retaining a boot on an upper surface of the gliding board.

15. A gliding apparatus according to claim 11, wherein said data exchange label includes a rewritable memory.

* * * * *